United States Patent [19]
Shiina

[11] Patent Number: 5,039,898
[45] Date of Patent: Aug. 13, 1991

[54] BRUSH HOLDER SUPPORT FOR DYNAMIC ELECTRIC MACHINE

[75] Inventor: Hiroyuki Shiina, Gunma, Japan

[73] Assignee: Mitsuba Electric Manufacturing Co., Ltd., Gunma, Japan

[21] Appl. No.: 530,810

[22] Filed: May 30, 1990

[51] Int. Cl.[5] ............................................. H02K 13/00
[52] U.S. Cl. ..................................... 310/239; 310/45; 310/91; 310/248
[58] Field of Search ............... 310/239, 241, 242, 245, 310/247, 248, 249, 42, 89, 91, 238, 45

[56] References Cited
U.S. PATENT DOCUMENTS

| | | | |
|---|---|---|---|
| 1,763,549 | 6/1930 | Apple | 310/239 U X |
| 3,745,393 | 7/1973 | Spors | 310/239 |
| 4,230,962 | 10/1980 | Carda | 310/239 |
| 4,538,085 | 8/1985 | Tanaka | 310/239 |

FOREIGN PATENT DOCUMENTS 3644128 7/1988 Fed. Rep. of Germany ...... 310/239

Primary Examiner—R. Skudy
Attorney, Agent, or Firm—Oliff & Berridge

[57] ABSTRACT

A brush holder support in a dynamic electric machine such as an electric motor includes an electrically insulating support plate which carries on its one side a plurality of brush holders slidably receiving brushes with pig-tails connected thereto. A pair of conductor plates are secured to the other side of the support plate concentrically with one another. The conductor plates are insulated plate from one another by a portion of the support located therebetween. Each of the pair of conductor plates provides electrical connections between the pig-tails of the brushes of the same polarity. The support plate includes notches formed in its inner and outer peripheral edges so as to provide passages for leading the pig-tails from the one side to the other side of the support plate.

9 Claims, 3 Drawing Sheets

BRUSH HOLDER SUPPORT FOR DYNAMIC ELECTRIC MACHINE

BACKGROUND OF THE INVENTION

1. Field of the Invention

The present invention relates to a brush holder support in a dynamic electric machine such as an electric motor.

2. Description of the Related Art

In general, a dynamic electric machine of the kind mentioned above incorporates brushes which are resiliently pressed onto commutator rings. There is a trend for a greater number of poles in this type of machine, in order to improve performance.

In such a dynamic electric machine having a large number of poles, it is necessary that a plurality of brushes 3 are arranged at a small pitch as shown in FIGS. 5 and 6. The electrical connections between the connecting portions 8 of the brushes 3 of the same polarity are achieved through soldering of lead lines and jumper lines 9a, 9b, or by spot-welding pig-tails 4 of the brushes directly to end portions of the brush holders. Such spot-welding is not easy to conduct because it is quite difficult to insert a welding electrode to the restricted regions where the brushes are densely arranged. In addition, there is a risk that the brush holder 2 will be undesirably deformed due to interference between the electrode and the brush holder 2.

The pig-tail 4 is required to have a certain length in order to enable the brush 3 to be mounted in the brush holder 2 and also to maintain electrical connection to the brush 3 even when the brush 3 has been worn down. Therefore, the pig-tail 4 connected to a brush may undesirably interfere with the brush spring which urges another brush 3, thus causing an electrical short-circuit. This problem would be avoided by ensuring electrical insulation between the springs and the pig-tails 4. Such a measure, however, inevitably leads to an increase in the size of the brush holder and, hence, of the dynamic electric machine.

SUMMARY OF THE INVENTION

Accordingly, an object of the present invention is to provide a brush holder support in a dynamic electric machine which is capable of overcoming the above-described problems.

To this end, according to the present invention, there is provided a brush holder support in a dynamic electric machine comprising a plurality of brush holders, on one side of an electrically insulating support plate, slidably receiving brushes with pig-tails connected thereto, and a pair of conductor plates secured to the other side of the support plate concentrically with one another. An outer diameter of one of the conductor plates is smaller than a corresponding inner diameter of the other conductor plate, and the plates are insulated from one another by a portion of the support plate located therebetween. Each of the pair of conductor plates provides electrical connections between the pig-tails of the brushes of the same polarity. The support plate further comprises notches formed in the inner and outer peripheral edges thereof so as to provide passages for leading the pig-tails from the one side to the other side of the support plate.

According to the invention, assembly and mounting of the brushes can be facilitated by virtue of the use of the conductor plates which electrically connect all the brushes of the same polarities.

The above and other objects, features and advantages of the present invention will become clear from the following description of the preferred embodiment when the same is read in conjunction with the accompanying drawings.

DESCRIPTION OF THE PREFERRED EMBODIMENT

A preferred embodiment of the present invention will be described with reference to the drawings.

Figure 1:
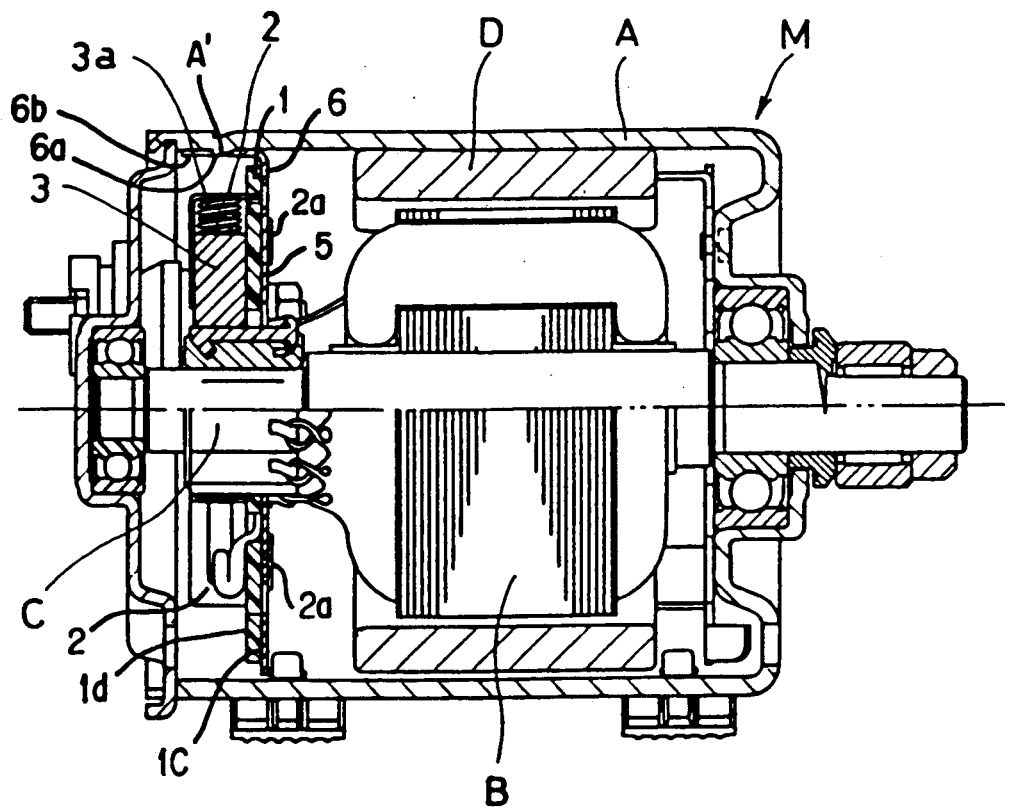
FIG. 1 is a sectional view of an electric motor.
Figure 2:
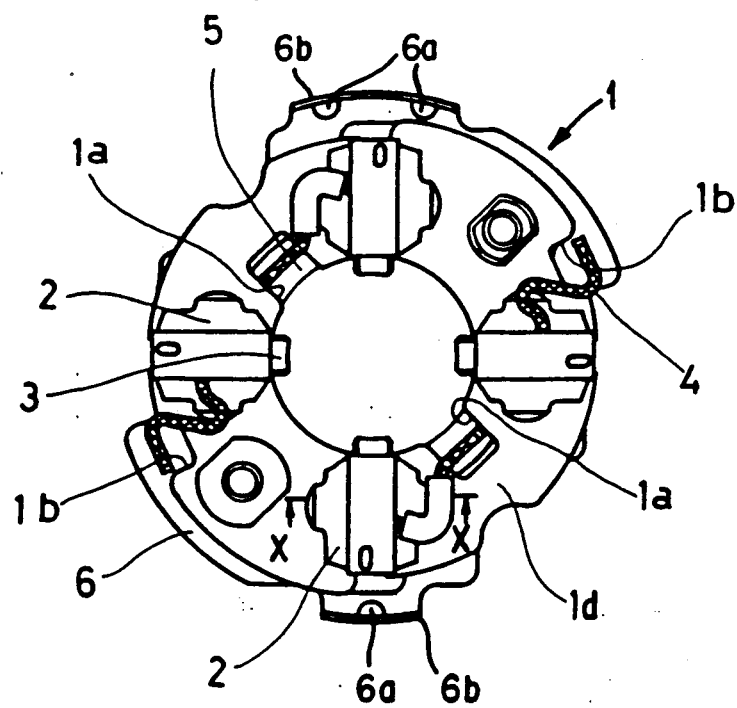
FIGS. 2, 3 and 4 are a front elevational view, a rear elevational view and a side elevational view, respectively, of a brush holder support embodying the present invention.
Figure 3:
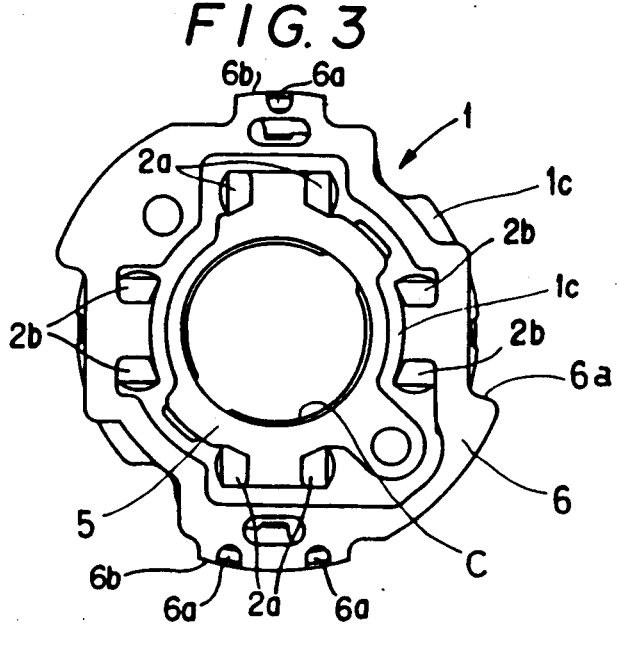
Figure 5:
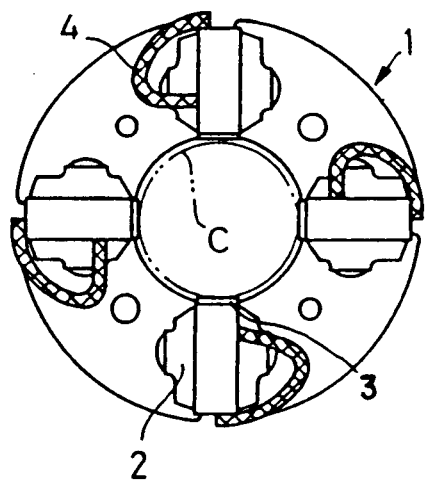
FIGS. 5 and 6 are a front elevational view and a rear elevational view of a conventional brush holder support.
Figure 4:
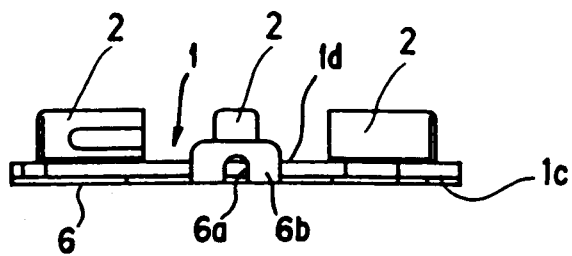
Figure 6:
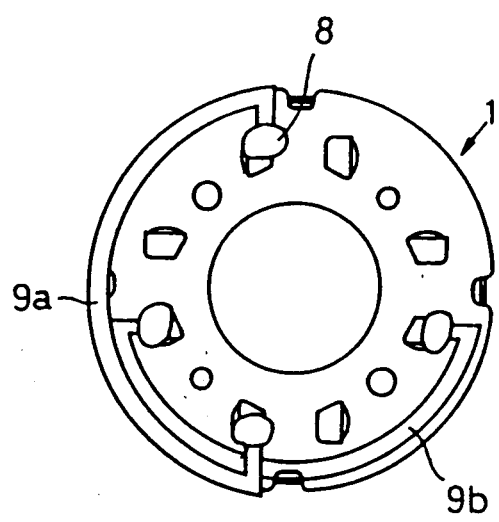
Figure 7:
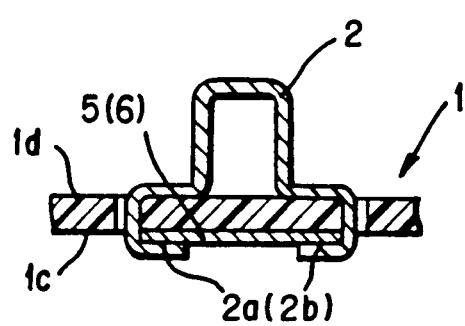
FIG. 7 is a cross-sectional view along the line X—X of FIG. 2.

Referring to FIGS. 1-4 and 7 of the drawings, a multi-pole motor M has a yoke A and a rotor B rotatably mounted in the yoke A. Permanent magnets D are integrally fixed on the inner peripheral surface of the yoke. The motor M has a brush holder support 1 with a support plate made of an electrically insulating material and fitted in the yoke A. In case of a 4-pole motor, for example, two sets of conductive brush holders 2 are secured to one side 1d of the support plate 1 as shown in FIG. 2. Each brush holder 2 radially slidably receives a brush 3 which is radially inwardly urged by a spring 3a into pressure contact with an associated commutator ring C provided on the rotor B.

Pig-tails 4 are connected at their one ends to the associated brushes 3 and are led to the reverse 1c side of the support plate 1 opposite to the brush holders through notches 1a and 1b respectively formed in the inner and outer peripheral edges of the support plate 1. The notches 1a are for passing pig-tails 4 for the brushes of the positive polarity, while the notches 1b are for those of negative polarity. Numerals 5 and 6 denote substantially ring-like shaped conductor plates which provide electrical connections between the brushes of the same polarities. The conductor plate 5 is for connection of 3the brushes of the positive polarity, while the conductor plate 6 is for those of the negative polarity. The conductor plate 5 has a smaller outer diameters than a corresponding inner diameter of conductor plate 6. Conductor plates 5 and 6 are arranged on the reverse side 1c of the support plate 1 concentrically with respect to one another and the commutator ring C. A portion of side 1c of the support plate is located between these two conductor plates 5 and 6, and insulates them from one another. These conductor plates 5 and 6 are fastened to the support plate 1 by means of folded ends of claws 2a, 2b, respectively, on the brush holders 2. The outer edge of conductor plate 6 is provided with one or more notches in one or more bent portions 6b. The notches 6a engage with protrusions A' on the inner peripheral surface of the yoke A so as to be correctly located with respect to the yoke A, and so as to be prevented from rotating relative to the yoke A. The pair of conductor plates 5 and 6 are formed simultaneously from a common sheet bank.

Therefore, as shown in FIG. 2, the conductor plate 5 (acting as the positive electrode) is exposed to the side 1d of the support plate 1 through the notches 1a formed in the inner peripheral edge of the support plate 1, and the conductor plate 6 (acting as the negative electrode) is exposed to the side 1d of the support plate 1 through the notches 1b formed in the outer peripheral edge of the support plate 1.

In the assembled state of the described embodiment, the brushes 3 on the support plate 1 are resiliently pressed onto the commutator ring C by the springs 3a. The pig-tails 4 connected to the respective brushes 3 are led through the notches 1a and 1b to positions on the conductor plates 5, 6 which are provided on the reverse side 1c of the support plate 1, so that the ends of the pig-tails 4 can be spot-welded to the conductor plates 5, 6 in such a manner that the weld spots are clearly visible to the operator. In addition, the brushes 3 of the same polarity are electrically connected through each conductor plate 5 or 6 simply by this spot-welding which can be performed without difficulty, thus eliminating the troublesome work required in the conventional arrangements such as preparation of lead lines and jumper lines and soldering of these lines, whereby the assembly of the electric machine is greatly facilitated. The spot-welding can be conducted while properly locating the ends of the pig-tails in such a manner as to avoid any unnecessary slack of the pig-tails while affording a sufficiently large margin of slack to accommodate radially inward movement of the brushes resulting from wear of the brushes. It is therefore possible to eliminate the problem of interference between the pig-tails of a brush and the spring of another brush, by preserving a sufficiently large gap between a pig-tail and the spring of the adjacent brush. It is also possible to prevent undesirable contact of each pig-tail with the yoke A. Thus, the brush holder support of the present invention provides a remarkable improvement in the safety and reliability of the dynamic electric machine.

The ends of the pig-tails 4, when led to the reverse side 1c of the support plate 1 through the radially inner and outer notches 1a, 1b, are automatically brought into contact with the conductor plates 5 and 6, so that the welding can be safely conducted while visually conforming the positions of the ends of the pig-tails 4 to be welded from the side 1d of the support plate 1. Consequently, the undesirable projection of the pigtails 4 beyond the peripheral edge of the support plate 1 can be prevented. Furthermore, it is not necessary to prepare and solder many lines such as lead lines and jumper lines. Thus, the present invention also contributes to simplification of the assembly process, as well as to improvement in the efficiency of the assembly work. In addition, heat radiation from the brushes and brush holders is enhanced by virtue of the conductor plates 5, 6 so as to avoid undesirable deformation of the brush holders due to mechanical and thermal loads which were previously imposed during spot-welding of the pig-tails, whereby the reliability of the product is improved.

Thus, according to the present invention welding of the pig-tails can be greatly facilitated even when the brush holders are densely arranged so that mechanical and electrical interference between adjacent brushes and pig-tails is eliminated to ensure a high reliability of the dynamic electric machine.

Although the invention has been described through specific terms, it is to be understood that the described embodiment is only illustrative and various changes and modifications may be imparted thereto without departing from the scope of the invention which is limited solely by the appended claims.

What is claimed is:

1. A brush holder support for a dynamic electric machine, comprising:
   a support plate made of an electrically insulating material;
   at least two brush holders attached to a first side of said support plate;
   at least one brush of positive polarity slidably contained within one of said brush holders, and at least one brush of negative polarity slidably contained within another of said brush holders;
   at least two pig-tails each having first and second ends, said first ends of said pig-tails being electrically connected to said brushes; and
   first and second conductor plates attached to a second side of said support plate in spaced apart relation so as to be insulated from one another, said second end of said pig-tail from said positive polarity brush being electrically connected to said first conductor plate and said second end of said pig-tail from said negative polarity brush being electrically connected to said second conductor plate.

2. The brush holder support of claim 1, further comprising notches through which said pig-tails are led from said first side of said support plate to said second side of said support plate.

3. The brush holder support of claim 2, wherein said notches are formed on inner and outer peripheral edges of said support plate.

4. The brush holder support of claim 1, wherein said first and second conductor plates have a substantially ring-like shape, and an outer diameter of said first conductor plate is smaller than a corresponding inner diameter of said second conductor plate.

5. The brush holder support of claim 4, wherein said first and second conductor plates are concentrically arranged on said second side of said support plate.

6. A brush holder support for a dynamic electric machine, comprising:
   a support plate made of an electrically insulating material;
   a plurality of brush holders attached to a first side of said support plate;
   a plurality of brushes of positive polarity slidably contained within some of said brush holders, and a plurality of brushes of negative polarity slidably contained within others of said brush holders;
   a plurality of pig-tails each having first and second ends, said first ends of said pig-tails being electrically connected to said brushes;
   first and second conductor plates each having a substantially ring-like shape, an outer diameter of said first conductor plate being smaller than a corresponding inner diameter of said second conductor plate, said first and second conductor plates being attached to and concentrically arranged on a second side of said support plate so as to be insulated from one another, said second ends of said pig-tails from said positive polarity brushes being electrically connected to said first conductor plate and said second ends of said pig-tails from said negative polarity brushes being electrically connected to said second conductor plate.

7. The brush holder support of claim 6, further comprising notches through which said pig-tails are led from said first side of said support plate to said second side of said support plate.

8. The brush holder support of claim 7, wherein said notches are formed on inner and outer peripheral edges of said support plate.

9. A brush holder support for a dynamic electric machine comprising:
- a support plate made of an electrically insulating material;
- a plurality of brush holders attached to a first side of said support plate;
- a plurality of brushes of positive polarity slidably contained within some of said brush holders, and a plurality of brushes of negative polarity slidably contained within others of said brush holders;
- a plurality of pig-tails each having first and second ends, said first ends of said pig-tails being electrically connected to said brushes;
- first and second conductor plates each having a substantially ring-like shape, an outer diameter of said first conductor plate being smaller than a corresponding inner diameter of said second conductor plate, said first and second conductor plates being attached to and concentrically arranged on a second side of said support plate so as to be insulated from one another, said second ends of said pig-tails from said positive polarity brushes being electrically connected to said first conductor plate and said second ends of said pig-tails from said negative polarity brushes being electrically connected to said second conductor plate; and
- notches formed on the inner and outer peripheral edges of said support plate through which said pig-tails are led from said first side of said support plate to said second side of said support plate.

* * * * *